(12) United States Patent
Zhou et al.

(10) Patent No.: US 7,881,396 B2
(45) Date of Patent: Feb. 1, 2011

(54) METHOD AND APPARATUS FOR TRANSMITTING AND RECEIVING A PREAMBLE FOR SYNCHRONIZATION IN A MIMO-OFDM COMMUNICATION SYSTEM

(75) Inventors: Yong-Xing Zhou, Yongin-si (KR); Jong-Han Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/717,194

(22) Filed: Mar. 4, 2010

(65) Prior Publication Data

US 2010/0195480 A1  Aug. 5, 2010

Related U.S. Application Data

(63) Continuation of application No. 10/965,087, filed on Oct. 14, 2004, now Pat. No. 7,702,028.

(30) Foreign Application Priority Data

Oct. 16, 2003 (KR) ............... 10-2003-0072176

(51) Int. Cl.
*H04B 7/02* (2006.01)
(52) U.S. Cl. .................................. 375/267
(58) Field of Classification Search .............. 375/267
See application file for complete search history.

(56) References Cited

U.S. PATENT DOCUMENTS 6,226,337 B1  5/2001  Klank et al.
6,377,632 B1  4/2002  Paulraj et al.
6,731,614 B1  5/2004  Ohlson et al.
7,061,854 B2  6/2006  Tarokh et al.

(Continued)

FOREIGN PATENT DOCUMENTS

EP    1 261 181    11/2002

(Continued)

OTHER PUBLICATIONS

Ye Li, "Simplified Channel Estimation for OFDM Systems with Multiple Transmit Antennas," *IEEE Transactions on Wireless Communications*, vol. 1, No. 1, Jan. 2002, pp. 67-75.

(Continued)

*Primary Examiner*—David C Payne
*Assistant Examiner*—Tanmay K Shah
(74) *Attorney, Agent, or Firm*—NSIP Law

(57) ABSTRACT

A method and apparatus for transmitting a preamble for frame synchronization and channel estimation in a MIMO-OFDM communication system are provided. An OFDM communication system using Q transmit antennas generates a base preamble sequence including a CP and an orthogonal sequence. If $Q \leq$ a predetermined number M, a preamble sequence for a kth antenna is $S(t-(k-1)T/M)$. If $Q > M$ and $k \leq M$, the preamble sequence transmitted for the kth antenna is $S(t-(k-1)T/M)$. If $Q > M$ and $k > M$, the preamble sequence for the kth antenna is $(-1)^{(PS-1)}S(t-(k-M-1)T/M)$. Here, $S(t)$ is the orthogonal sequence, T is the period of the orthogonal sequence, and PS is an index indicating a transmission period of the preamble sequence. The preamble sequences are at least twice transmitted from the Q transmit antennas.

42 Claims, 14 Drawing Sheets

U.S. PATENT DOCUMENTS

| | | |
|---|---|---|
| 7,068,628 B2 | 6/2006 | Li et al. |
| 7,136,410 B2 | 11/2006 | Choi et al. |
| 7,139,320 B1 | 11/2006 | Singh et al. |
| 7,139,340 B2 | 11/2006 | Scarpa |
| 7,154,964 B1 | 12/2006 | Al-Dhahir et al. |
| 7,184,495 B2 | 2/2007 | Thomson et al. |
| 7,263,058 B2 | 8/2007 | Joo |
| 7,269,127 B2 | 9/2007 | Mody et al. |
| 2002/0181390 A1 | 12/2002 | Mody et al. |
| 2003/0016621 A1 | 1/2003 | Li |
| 2003/0043887 A1 | 3/2003 | Hudson |
| 2004/0050022 A1 | 3/2004 | Marrecau et al. |
| 2004/0071234 A1 | 4/2004 | Li |
| 2004/0081131 A1 | 4/2004 | Walton et al. |
| 2004/0131011 A1 | 7/2004 | Sandell et al. |
| 2004/0131012 A1 | 7/2004 | Mody et al. |

FOREIGN PATENT DOCUMENTS

| | | |
|---|---|---|
| WO | WO 02/098088 | 12/2002 |

OTHER PUBLICATIONS

Imad Barhumf et al., "Optimal Training Design for HIMO OFOH Systems in Mobile Wireless Channels," *IEEE Transactions on Signal Processing*, vol. 51, No. 6, Jun. 2003, pp. 1615-1624.

Apurva N. Mody et al., "Receiver Implementation for a MINO OFDM System," *IEEE Global Telecomnunications Conference*, Nov. 2002, pp. 716-720.

Sumei Sun et al., "Training Sequence Assisted Channel Estimation for MIMO OFDM,"*Wireless Communications and Networking*, 2003, WCNC 2003, 2003 IEEE vol. 1, Mar. 16-20, 2003, pp. 38-43, vol. 1.

B.Y. Prasetyo et al., "Fast Burst Systems Synchronisation Technique for OFDM-WLAN," *IEE Proceedings—Communications*, vol. 147, No. 5, Oct. 2000, pp. 292-298.

Yasamin Mostofi et al., "Effect of Frame Synchronization Errors on Pilot-Aided Channel Estimation In OFDM: Analysis and Solution," *Wireless Personal Multimedia Communications, The 5th International Symposium*, vol. 3, Oct. 27-30, 2002, pp. 1309-1313.

European Search Report dated Nov. 13, 2006, in corresponding European Patent Application No. 04024667.0.

METHOD AND APPARATUS FOR TRANSMITTING AND RECEIVING A PREAMBLE FOR SYNCHRONIZATION IN A MIMO-OFDM COMMUNICATION SYSTEM

CROSS-REFERENCE TO RELATED APPLICATIONS

This application is a continuation of U.S. application Ser. No. 10/965,087, filed Oct. 14, 2004, now U.S. Pat. No. 7,702,028 which claims priority under 35 U.S.C. §119 to an application entitled "Method of Transmitting Preamble for Synchronization in a MIMO-OFDM Communication System" filed in the Korean Intellectual Property Office on Oct. 16, 2003 and assigned Serial No. 2003-72176, the contents of each of which is incorporated herein by reference in its entirety for all purposes.

BACKGROUND OF THE INVENTION

1. Field of the Invention

The present invention relates generally to a multi-input multi-output-orthogonal frequency division multiplexing (MIMO-OFDM) communication system, and in particular, to a method and apparatus for transmitting a preamble for frame synchronization.

2. Description of the Related Art

OFDM is widely considered an essential transmission scheme for next-generation wireless communications for its simple implementation, robustness against multi-channel fading, and its capability of increasing the data rate through parallel transmission of data signals at frequencies called sub-carriers. The sub-carriers are mutually orthogonal to avoid inter-carrier interference. Their spectrums are overlapped so that the sub-carriers are spaced from each other with a minimum gap.

An OFDM system is sensitive to errors or offsets including a frequency offset, timing errors in a frame or a symbol, and non-linearity caused by a high peak-to-average power ratio (PAPR). Some OFDM systems utilize a coherent detection rather than differential modulation and demodulation in order to achieve an additional signal-to-noise ratio (SNR) gain of about 3 dB. Their performance depends considerably on whether or not channel state information (CSI) is available.

The use of multiple transmit/receive antennas further improves communication quality and throughput in an OFDM system. This OFDM system is called a MIMO-OFDM system which is distinguished from a single-input single-output (SISO)-OFDM system.

The MIMO-OFDM system can simultaneously transmit data on a plurality of sub-channels in the space domain irrespective of whether or not a transmitter requires the CSI. The sub-channels refer to radio paths from a plurality of transmit antennas to a plurality of receive antennas. Thus, the MIMO-OFDM system offers a higher data rate than the SISO-OFDM system.

Typically, the MIMO/SISO-OFDM system requires frame synchronization in both time and frequency and estimation of channel parameters and noise changes. For the synchronization and estimation, a preamble sequence (i.e. training symbols or a training sequence) is used.

FIG. 1 illustrates the structure of an OFDM frame including a preamble sequence in a typical OFDM communication system. Referring to FIG. 1, the preamble sequence consists of special symbols added as a prefix to the OFDM frame. In general, the structure and contents of the preamble are known between a transmitter and a receiver. The preamble is so configured as to have a relatively low complexity and offer a maximum performance in the synchronization and estimation process.

An ideal preamble configuration satisfies the following requirements:

(1) Excellent compensation for timing synchronization;
(2) Low PAPR for high-power transmission;
(3) Feasibility for channel estimation;
(4) Feasibility for frequency offset estimation over a wide range; and
(5) Low computation complexity, low overhead and high accuracy.

A description will be made below of conventional preamble structures for MIMO-OFDM frame synchronization and channel estimation.

A first known preamble transmitting/receiving scheme for MIMO-OFDM frame synchronization transmits the same information sequence through all transmit antennas.

The MIMO-OFDM system must have excellent properties in time-domain periodic auto-correlation of sequences as well as in cross-correlation of sequences transmitted from different transmit antennas. Ideal auto-correlation and cross-correlation properties are determined by Equation (1) and Equation (2), respectively:

$$\phi(k) = \sum_{n=0}^{N-1} s_{q,n}^* \cdot s_{q,(n+k)_N} = \begin{cases} 1 & k = 0 \\ 0 & k \neq 0 \end{cases} \quad (1)$$

$$\Psi(k) = \sum_{n=0}^{N-1} s_{q,n}^* \cdot s_{q',(n+k)_N} = 0 \text{ for all } k, q \neq q' \quad (2)$$

where superscript * denotes a conjugate operator, N denotes the length of sequences, q and q' denote indexes of transmit antennas, and $s_{q,n}$ denotes an nth data symbol in a sequence of length N transmitted from a qth transmit antenna. A sequence that satisfies Equation (1) is an orthogonal sequence. Here, subscript N denotes the period of the sequence.

In an ideal situation a space-time matrix for sequences transmitted from N transmit antennas is a unit matrix. However, this is impossible in its application because the number of the transmit antennas must be equal to the length of the sequences.

In the first preamble transmitting/receiving scheme, a preamble sequence is designed for frame synchronization by copying a predetermined orthogonal sequence designated for a first antenna to be used for the other antennas, and is represented by $$s_{q,n} = s_n \text{ for all } q \quad (3)$$

A distinctive shortcoming of the above scheme is that SNR may be very low in the case of a correlated channel. For a 2×2 MIMO system using two transmit antennas and two receive antennas, for instance, a received signal is expressed as $$r_j[n, k] = \sum_i H_{ij}[n, k] S[n, k] + n_j[n, k] \quad (4)$$

where $r_j[n, k]$ denotes a frequency-domain signal received at a jth receive antenna, $n_j[n, k]$ denotes white Gaussian noise, $H_{ij}$ denotes a channel response from an ith transmit antenna to a jth receive antenna, and $S[n, k]$ denotes an nth symbol in a k-th sub-carrier. As noted from Equation (4), if $H_{1j}$ is approximately equal to $-H_{2j}$, the SNR of the received signal is very low.

Another conventional preamble transmitting/receiving scheme for MIMO-OFDM frame synchronization utilizes a direct modulated orthogonal poly-phase sequence.

A direct modulated orthogonal poly-phase sequence is a chirp-like sequence used to form a preamble sequence. If P is a prime number, the direct modulated orthogonal poly-phase sequence is comprised of (P−1) orthogonal sequences. Its excellent cross-correlation property is given as $$\Phi(k) = \sum_{n=0}^{p^2-1} s^*_{q,n} \cdot s_{q',(n+k)_{p^2}} \le \frac{1}{p^2} \text{ for all } k, q \ne q' \quad (5)$$

According to the second preamble transmitting/receiving scheme, the transmit antennas transmit the same preamble sequence having (P−1) orthogonal sequences. This scheme faces the following problems:

(1) Although the length of the direct modulated orthogonal poly-phase sequence is the square of a prime number, the length of an OFDM frame must generally be a power of 2, for example, 64, 128, 256, . . . ; and (2) While an ideal frame must be acquired at each point, it is impossible to reduce the complex multiplications required and thus considerably greater computation is required.

Now, known preamble transmitting/receiving schemes for MIMO-OFDM channel estimation will be described below.

A first preamble transmitting/receiving scheme for MIMO-OFDM channel estimation is Geoffrey Li's single-symbol optimal training technique. FIG. 2 illustrates a preamble structure according to the first preamble transmitting/receiving scheme for MIMO-OFDM channel estimation.

Referring to FIG. 2, given Q transmit antennas, a first antenna transmits a preamble sequence S(t), and each of the other antenna transmits a preamble sequence S(t−T/Q), . . . , or S{t−(Q−1)T/Q} produced by rotating a preamble sequence for the previous antenna a predetermined number of symbols, that is, T/Q symbols. Q=Floor(N/L$_0$) in which N is the number of sub-carriers and L$_0$ is the maximum time delay spread of a sub-channel. Floor( ) is a function of obtaining an integer and T is the period of the preamble sequence. T is the product of the number of symbols included in the preamble sequence, N, and a symbol period T$_s$.

A received signal at the jth receive antenna is determined by $$r_j[n,k] = \sum_i H_{ij}[n,k]S[n,k]W_N^{k \cdot L_0} + n_j[n,k] \quad (6)$$

where $W_N$ represents an N-point fast Fourier transform (FFT). If p[n, k]=r[n, k]*S*[n, k], Equation (6) is expressed as $$P_j[n,k] = \sum_i H_{ij}[n,k]W_N^{-k \cdot L_0} + n_j[n,k] \cdot S^*[n,k] \quad (7)$$

FIG. 3 illustrates an example of the time-domain channel response characteristics of $P_j[n, k]$. Referring to FIG. 3, $h_{0j}$ is a channel response characteristic from a first transmit antenna to a receiver, $h_{1j}$ is a channel response characteristic from a second transmit antenna to the receiver, $h_{2j}$ is a channel response characteristic from a third transmit antenna to the receiver, and $h_{3j}$ is a channel response characteristic from a fourth transmit antenna to the receiver. Preamble sequences transmitted from the transmit antennas experience channels having different characteristics. The time-domain size T/Q of the channels varies with the number of the transmit antennas Q.

A mean square error (MSE) in the single-symbol optimal training technique is calculated by $$MSE = \frac{L_0}{N} \cdot \sigma_n^2 \quad (8)$$

wherein, $\sigma_n$–$\sigma_n$ indicates a noise power.

In accordance with the first preamble transmitting/receiving scheme for MIMO-OFDM channel estimation, although a preamble sequence is transmitted on all sub-carriers, only one training sequence structure suffices. However, due to the rotation of a training sequence by a predetermined number of symbols for each transmit antenna, the number of transmit antennas is limited by the number of the rotated symbols and the length of the training sequence.

A second preamble transmitting/receiving scheme for MIMO-OFDM channel estimation utilizes Cordon L. Stuber and Apurva N. Mody's space-time coding. In this scheme, known symbols are orthogonally transmitted in the space domain through inversion and conjugation according to time and space, namely according to transmit antennas. A preamble sequence for a 2×2 system using two transmit antennas and two receive antennas is formed by $$\begin{bmatrix} S_1 & S_2 \\ -S_2^* & S_1^* \end{bmatrix} \quad (9)$$

The above matrix means that symbols $S_1$ and $S_2$ are sequentially transmitted from a first transmit antenna and symbols $S_2$* and $S_1$* are sequentially transmitted from a second transmit antenna.

For a 4×4 system, a preamble sequence can be formed by $$\begin{bmatrix} S_1 & S_1 & S_1 & S_1 \\ -S_2 & S_1 & -S_4 & S_3 \\ -S_3 & S_4 & S_1 & -S_2 \\ -S_4 & -S_2 & S_2 & S_1 \end{bmatrix} \quad (10)$$

FIG. 4 illustrates transmission/reception of a preamble sequence according to the second preamble transmitting/receiving scheme for MIMO-OFDM channel estimation.

Referring to FIG. 4, Q preamble sequences, each having Q symbols are provided to Q transmit antennas from time t to time t+(Q−1)T$_s$ through Q OFDM modulators. T$_s$ is a symbol duration. The preamble sequences arrive at L receive antennas on Q×L sub-channels having channel response characteristics $h_{11}$ to $h_{QL}$. L OFDM demodulators collect signals $R_1$ to $R_{QL}$ received at the L receive antennas from time t to time t+(T−1)T$_s$ and form a Q×L received signal matrix.

In the second preamble transmitting/receiving scheme, the minimum number of training symbols needed for each transmit antenna is equal to the number of transmit antennas. As more training symbols are used, the preamble sequences are longer. This is not feasible for burst or high-mobility communications.

SUMMARY OF THE INVENTION

An object of the present invention is to substantially solve at least the above problems and/or disadvantages and to provide at least the advantages below. Accordingly, an object of the present invention is to provide an effective preamble sequence structure and an effective preamble sequence transmitting method in a MIMO-OFDM system.

Another object of the present invention is to provide a method and apparatus for generating a preamble of a multi-symbol space-time structure in a MIMO-OFDM system.

The above objects are achieved by a method and apparatus for transmitting a preamble for frame synchronization and channel estimation in a MIMO-OFDM communication system. An OFDM communication system using Q transmit antennas generates a base preamble sequence including a cyclic prefix (CP) and an orthogonal sequence, generates a preamble sequence for each of the Q transmit antennas by rotating the orthogonal sequence by a predetermined number of symbols, and at least twice transmits the generated preamble sequences from the Q transmit antennas.

If $Q \leq$ a predetermined number M, a preamble sequence for a kth antenna is $S(t-(k-1)T/M)$. If $Q>M$ and $k \leq M$, the preamble sequence transmitted for the kth antenna is $S(t-(k-1)T/M)$. If $Q>M$ and $k>M$, the preamble sequence for the kth antenna is $(-1)^{(PS-1)}S(t-(k-M-1)T/M)$. Here, $S(t)$ is the orthogonal sequence, T is the period of the orthogonal sequence, and PS is an index indicating a transmission period of the preamble sequence.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

A MIMO-OFDM system to which the present invention is applied will first be described below.

Figure 1:
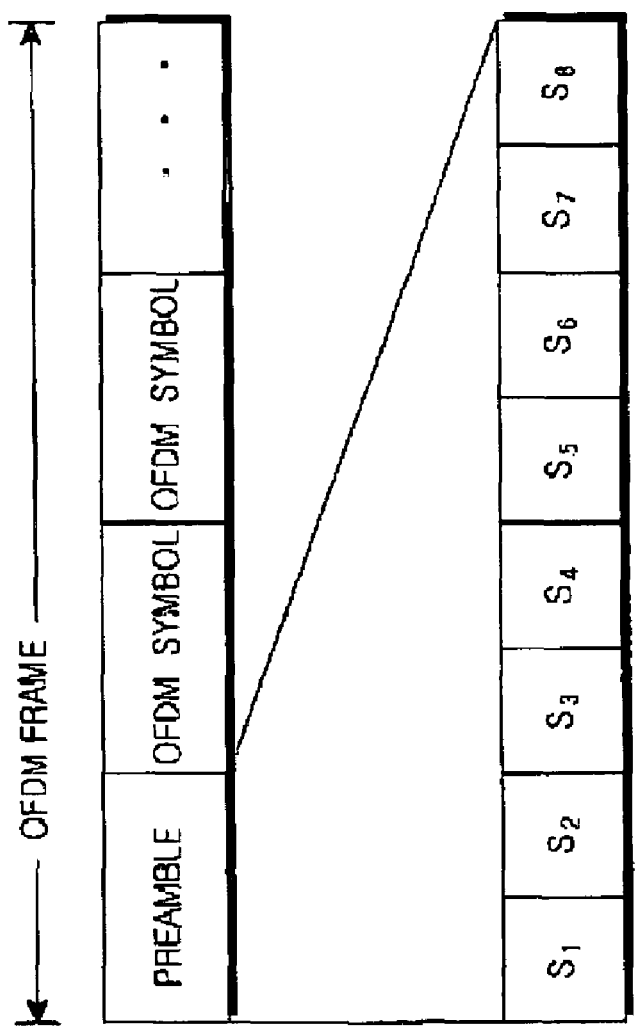
FIG. 1 illustrates the structure of an OFDM frame including a preamble sequence in a typical OFDM communication system.
Figure 2:
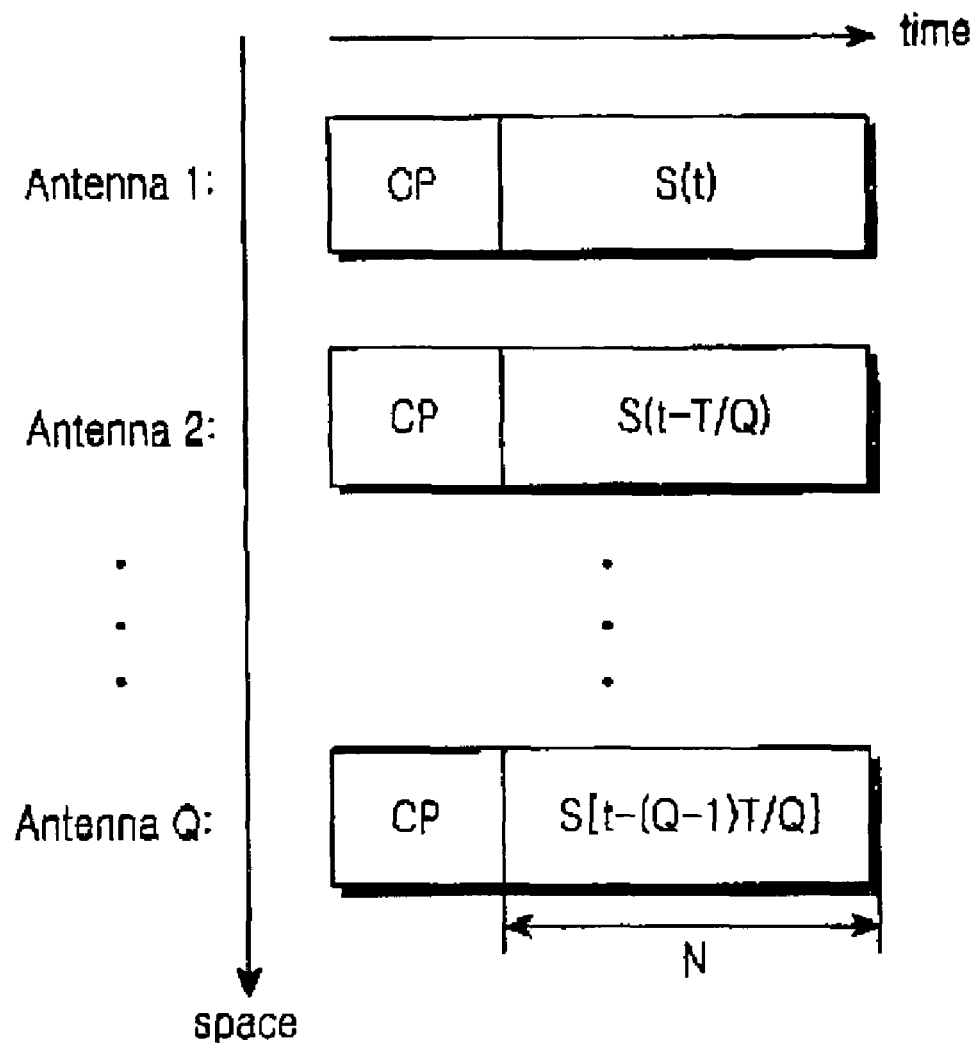
FIG. 2 illustrates the structure of a preamble according to a conventional preamble transmitting/receiving scheme for MIMO-OFDM channel estimation.
Figure 3:
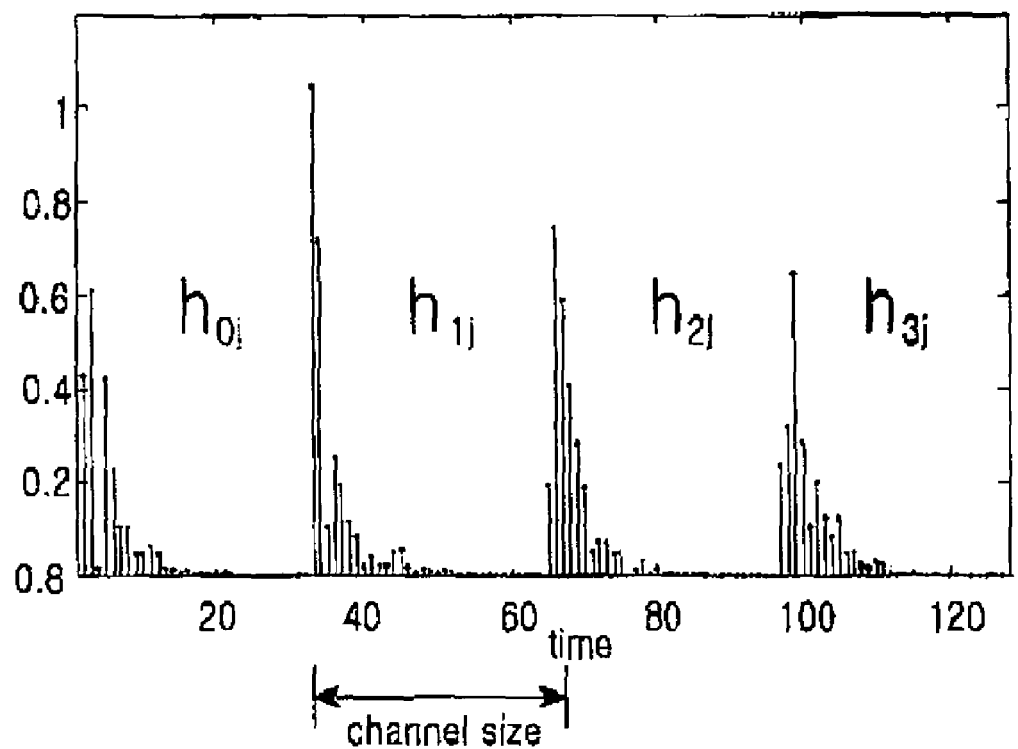
FIG. 3 illustrates an example of time-domain channel response characteristics of $P_j[n, k]$.
Figure 4:
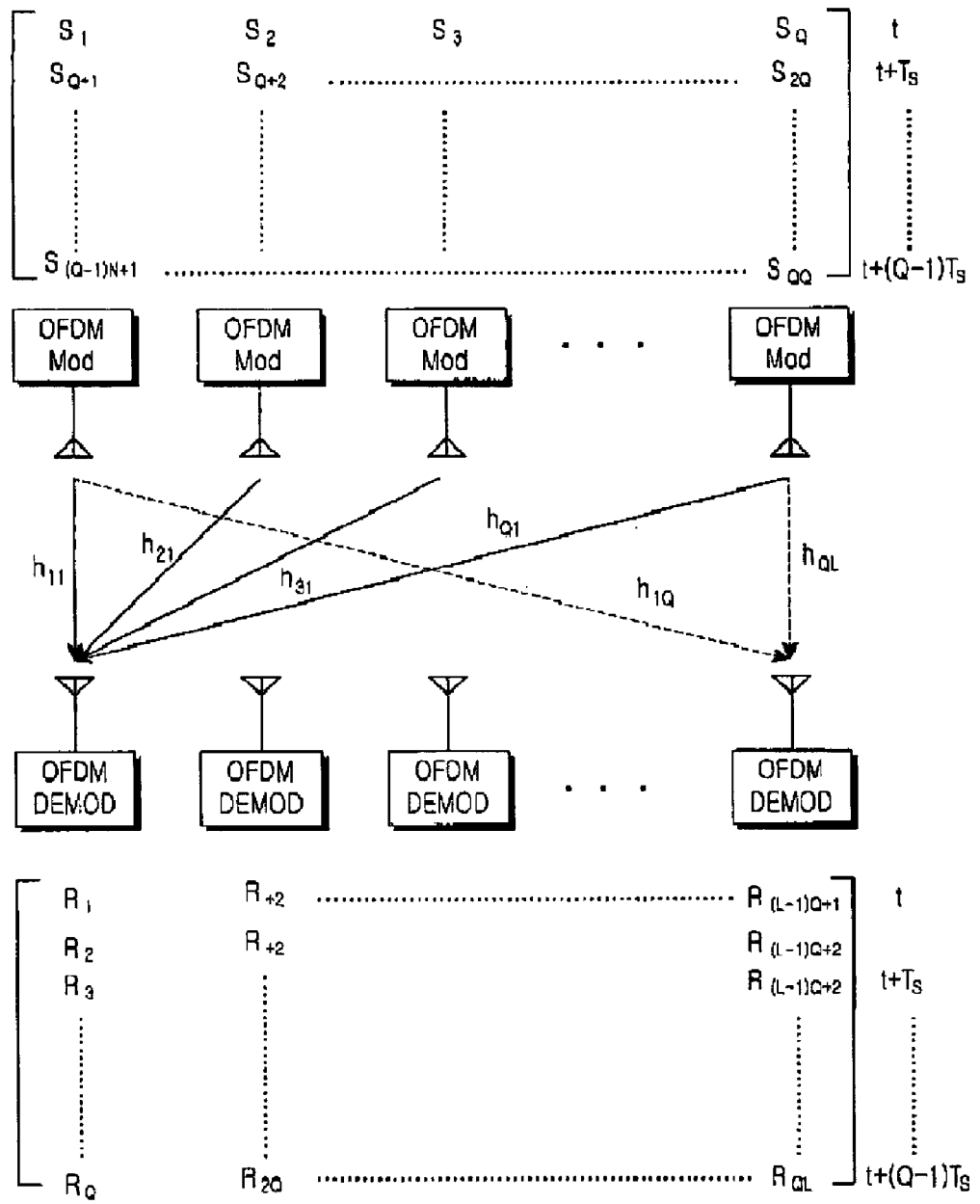
FIG. 4 illustrates transmission/reception of a preamble sequence according to another conventional preamble transmitting/receiving scheme for MIMO-OFDM channel estimation.
Figure 5:
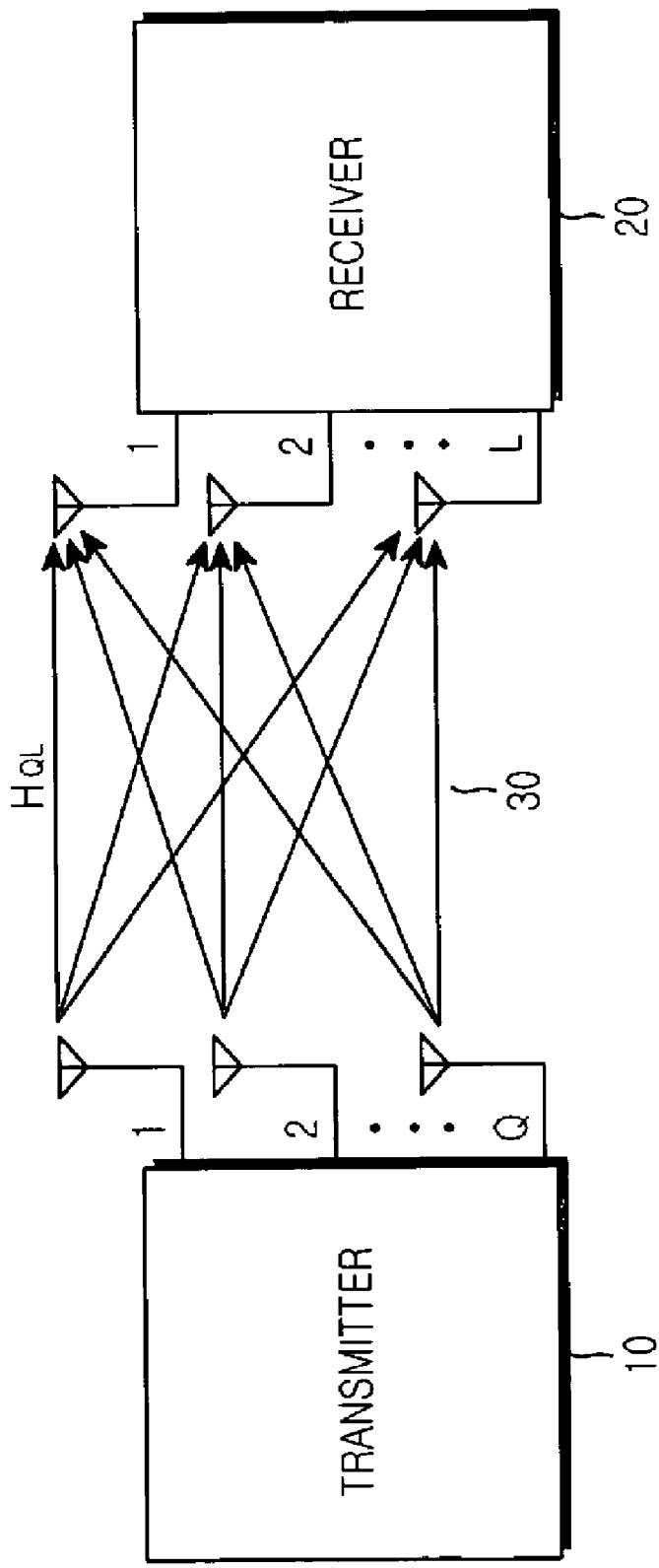
FIG. 5 is a simplified block diagram of a typical MIMO system.

FIG. 5 is a simplified block diagram of a typical MIMO system. Referring to FIG. 5, Q×L sub-channels 30 are defined between a transmitter 10 having Q transmit antennas and a receiver 20 having L receive antennas. The sub-channels 30 each have a unique channel response characteristic $h_{ql}$ and these characteristics are expressed as a Q×L channel matrix $H_{QL}$.

Figure 6:
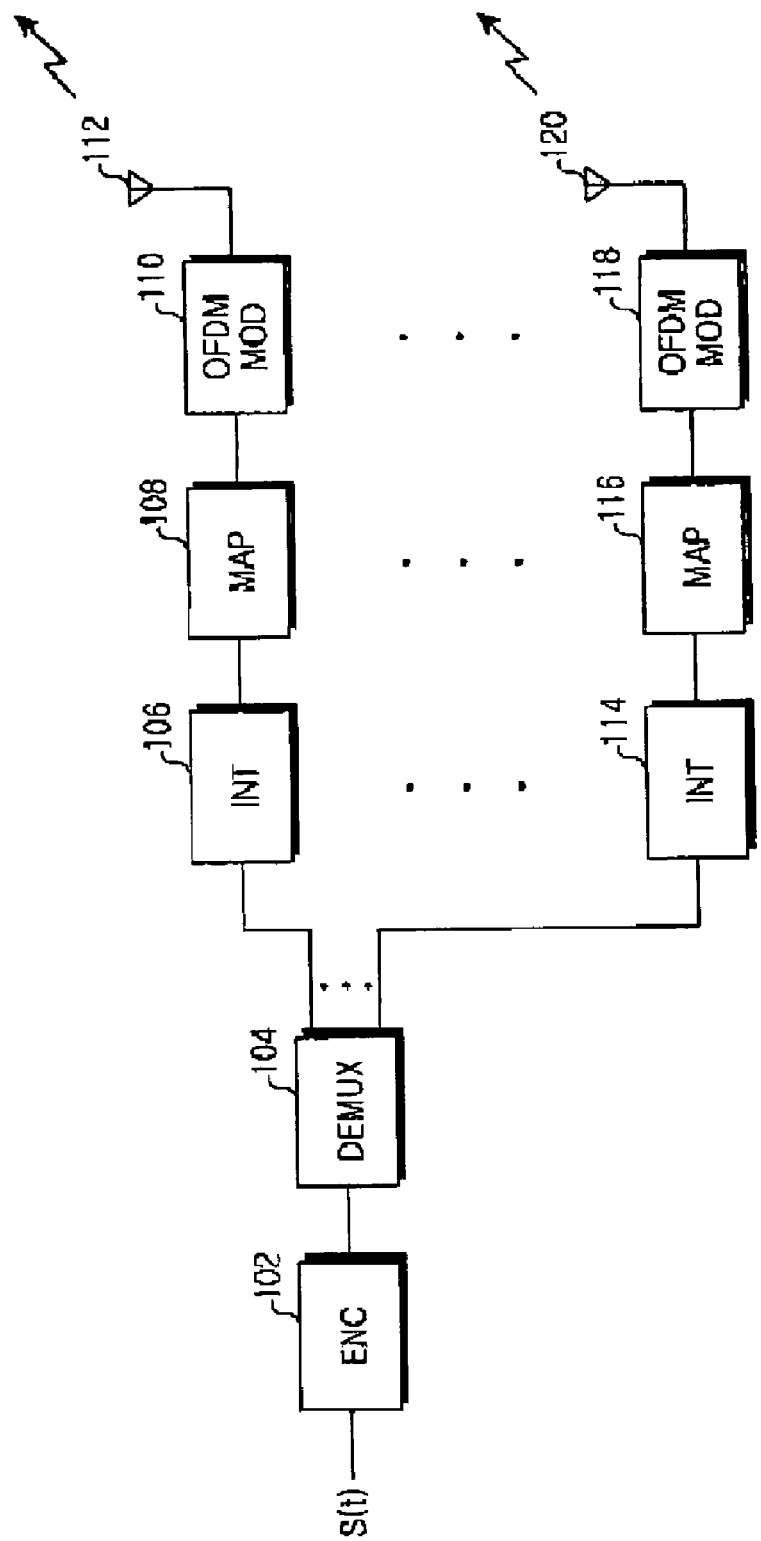
FIG. 6 is a block diagram of a transmitter in a MIMO-OFDM system to which the present invention is applied.

FIG. 6 is a block diagram of a transmitter in a MIMO-OFDM system to which the present invention is applied. The transmitter transmits the same user information through a plurality of transmit antennas to achieve an antenna diversity gain.

Referring to FIG. 6, an encoder (ENC) 102 generates a coded sequence by encoding an information sequence $S(t)$ at a predetermined code rate. A demultiplexer (DEMUX) 104 distributes the coded sequence to a plurality of interleavers (INTs) 106 to 114 corresponding to transmit antennas 112 to 120. The interleavers 106 to 114 each interleave the input bits. Mappers (MAPs) 108 to 116 each map the interleaved bits to modulation symbols according to a mapping rule, for example, PSK (Phase Shift Keying) or QAM (Quadrature Amplitude Modulation).

OFDM modulators (MODs) 110 to 118 each generate an OFDM symbol by inserting a pilot symbol for every predetermined number of modulation symbols, generate an OFDM frame by adding a preamble sequence having known symbols at the start of a predetermined number of OFDM symbols, and inverse-fast-Fourier-transform (IFFT) the OFDM frame. The IFFT OFDM frames are transmitted through their corresponding transmit antennas 112 to 120 through an RF (Radio Frequency) module (not shown).

Figure 7:
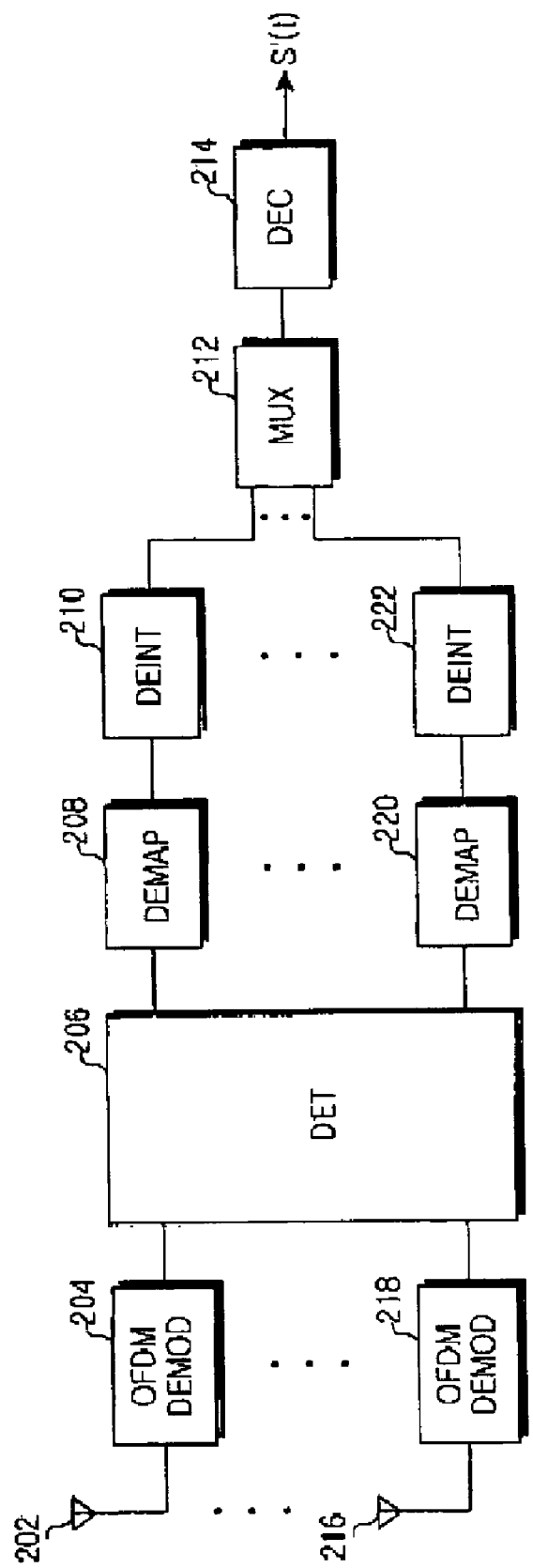
FIG. 7 is a block diagram of a receiver in the MIMO-OFDM system to which the present invention is applied.

FIG. 7 is a block diagram of a receiver in the MIMO-OFDM system to which the present invention is applied. The receiver is a counterpart to the transmitter illustrated in FIG. 6.

Referring to FIG. 7, signals received at receive antennas 202 to 216 are applied to the inputs of OFDM demodulators (DEMODs) 204 to 218 through an RF module (not shown). The OFDM demodulators 204 to 218 each distinguish a preamble from OFDM symbols on a frame-by-frame basis, accurately acquire frame synchronization by detecting the preamble, and generate a plurality of modulation symbols by fast-Fourier-transforming the signal. While not shown, the detected preamble is used in a channel estimator that estimates channel response characteristics from the transmitter to the receiver.

Demappers (DEMAPs) 206 to 216 each demap received modulation symbols according to a demapping rule corresponding to the mapping rule used in the transmitter. Deinterleavers (DEINTs) 208 to 216 each deinterleave demapped bits according to a deinterleaving rule corresponding to the interleaving rule used in the transmitter. A multiplexer (MUX) 212 multiplexes the deinterleaved bits and a decoder 210 recovers the information sequence S(t) by decoding the multiplexed bits at the code rate used in the transmitter.

In the MIMO-OFDM system having the above configuration, a preamble sequence consists of special symbols generated by an OFDM modulator and attached to an OFDM frame to indicate the start of the OFDM frame. A mobile station must synchronize to the start point of the data to receive the data. For this purpose, the mobile station acquires a preamble sequence commonly used in the entire system before receiving the data.

The preamble sequence is used for frame synchronization, frequency synchronization (i.e. frequency offset estimation), and channel estimation. The OFDM communication system estimates time/frequency/channel information using the preamble sequence at the start of each frame or data burst, and updates the time/frequency/channel information using a cyclic prefix (CP), inserted to avoid inter-symbol interference, and pilot symbols inserted between modulation symbols.

As known, frame synchronization is performed in two stages: coarse frame synchronization and fine frame synchronization.

The coarse frame synchronization is the process of detecting the start point of an OFDM frame by sampling in an approximate range. The correlation peak of a CP is used for the coarse frame synchronization. The following equation represents a metric for the coarse frame synchronization $$\phi_n = \left\| \sum_{k=0}^{G-1} (r_{j,n+k}^* \cdot r_{j,n+k+N}) \right\|^2 \quad (11)$$

where G denotes the window size of the frame synchronization, $r_{j,x}$ denotes an xth signal in a sequence received at a jth receive antenna, and N denotes the length of the sequence. Thus, a coarse frame start point is a time index n that maximizes $\phi_n$.

The coarse frame synchronization reduces the range of fine frame synchronization. The computation range of Equation (12) is narrow compared to that of Equation (2), in calculating the cross-correlation property for the fine frame synchronization $$\phi(k) = \sum_{n=0}^{N-1} s_{q,n}^* \cdot s_{q',(n+k)_N} = 0 \text{ for all } k \in K_{catch}, q \neq q' \quad (12)$$

where $s_{q,n}$ denotes an nth data symbol in a sequence transmitted from a qth transmit antenna and $K_{catch}$ denotes the range of the fine frame synchronization. Thus, the frame start point is a time index k that makes the fine frame synchronization metric $\phi(k)$ zero.

An embodiment of a preamble sequence structure design in a multi-channel WLAN system according to the present invention will now be described.

Let a root mean square (RMS) delay be equal to 50 ns, a sampling time be equal to 25 ns, a CP length be equal to 32 points, and the total length of data be equal to 128 points. The length of valid data in the data is 112 points, and the DC (Direct Current) and edge components in a signal frequency band are nulls. Here, a 2×2 MIMO system using two transmit antennas and two receive antennas is used as an example. A point refers to the position of a sub-carrier subject to N-point FFT. For example, if a CP is 32 points long, this implies that the CP is transmitted on 32 sub-carriers.

First of all, orthogonal sequences are generated using an extended CAZAC (Constant Amplitude Zero Auto-Correlation) sequence.

For example, a base CAZAC sequence is $$1, 1, 1, 1, 1, j, -1, -j, 1, -1, 1, -1, 1, -j, -1, j \quad (13)$$

By inserting three zeroes between every adjacent pair of elements in the base CAZAC sequence, the following sequence is generated $$1, 0, 0, 0, 1, 0, 0, 0, 1, 0, 0, 0, 1, 0, 0, 0, 1, 0, 0, 0, j, 0,$$
$$0, 0, -1, 0, 0, 0, -j, 0, 0, 0, 1, 0, 0, 0, -1, 0, 0, 0,$$
$$1, 0, 0, 0, -1, 0, 0, 0, 1, 0, 0, 0, -j, 0, 0, 0, -1, 0,$$
$$0, 0, j \quad (14)$$

The peak-to-average power ratio of the above extended CAZAC sequence is 6 dB.

The above orthogonal sequence is converted to the frequency domain, for spectrum shaping. The resulting new sequence is again converted to the time domain, to thereby create a preamble sequence.

Thus, the preamble structure according to the present invention is given as illustrated in Table 1 below.

TABLE 1

| CP0 | $S_{64}[1:64]$ | $S_{64}[1:64]$ | Antenna 0 |
|---|---|---|---|
| CP1 | $S_{64}[33:64]$ | $S_{64}[33:64]$ | Antenna 1 |
| | $S_{64}[1:32]$ | $S_{64}[1:32]$ | |

Figure 8:
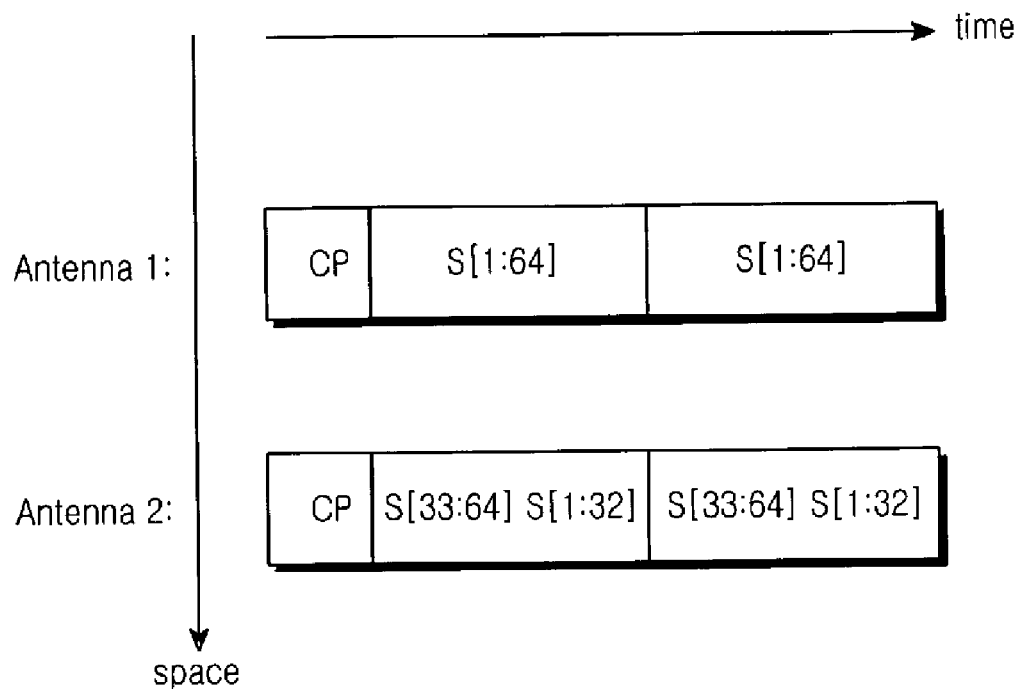
FIG. 8 illustrates an embodiment of a preamble structure according to the present invention.
Figure 9:
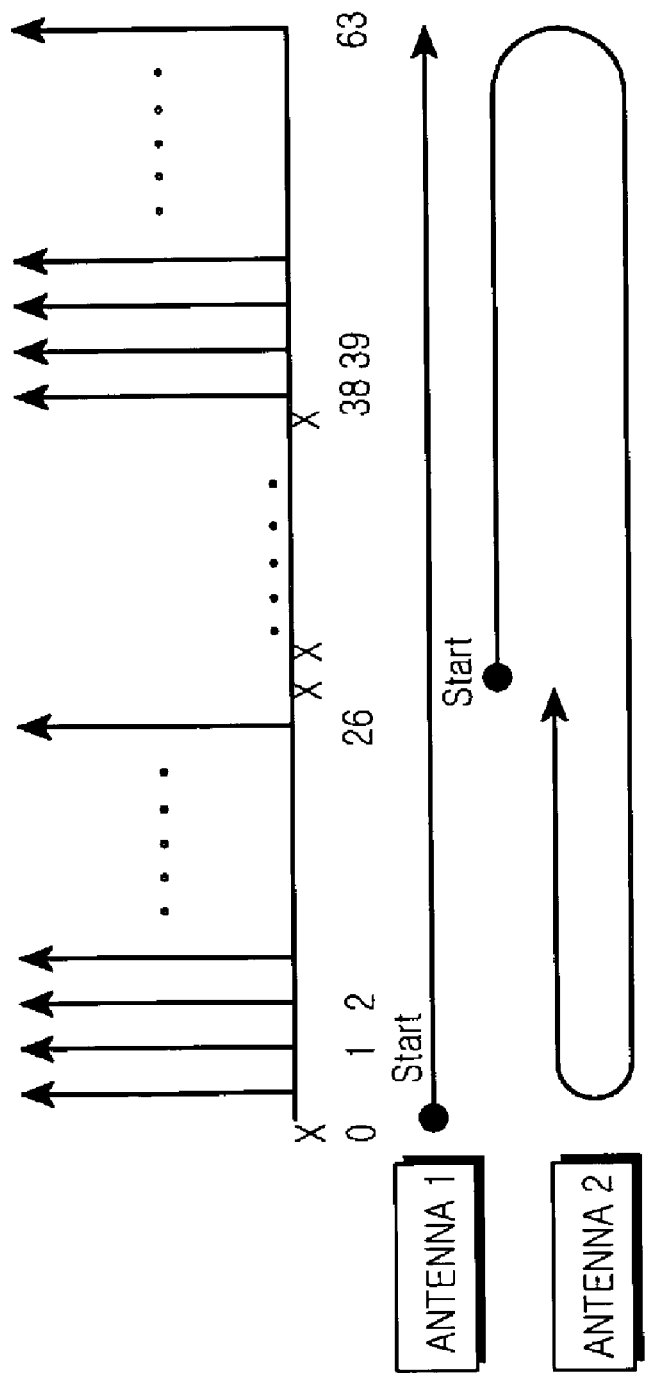
FIG. 9 illustrates the transmission of preambles illustrated in FIG. 8.

FIG. 8 illustrates the preamble structure according to an embodiment of the present invention, and FIG. 9 illustrates transmission of preambles illustrated in FIG. 8. As stated earlier, the illustrated preamble structure is for the 2×2 MIMO system.

Referring to FIG. 8, a first antenna (antenna 1) transmits a sequence of 64 bits, S[1:64] for a first transmission period and a second antenna (antenna 2) transmits a 32-bit rotated version of the sequence, S[33:64]S[1:32]. 32 bits is the quotient of dividing the sequence length, 64, by the number of the transmit antennas, 2. These sequences are repeatedly transmitted for a second transmission period. Transmission of a 64-bit sequence is equivalent to the use of 64 sub-carriers. Therefore, as illustrated in FIG. 9, the first antenna transmits the input sequence on sub-carriers #0 to #63, while the second antenna transmits the input sequence on sub-carriers #32 to #31.

Then, the receiver cross-correlates the extended CAZAC sequence with received complex symbols, thereby performing the fine frame synchronization by $$\Phi_n = \sum_{q=1}^{Q} \frac{|\phi_{q,n}|^2}{(P_n')^2} \quad (15)$$

where $$\phi_{q,n} = \sum_{k=0}^{N-1} (s_{q,k}^* \cdot r_{j,n+k})$$

$$P_n' = \sum_{k=0}^{N-1} |r_{j,n+k}|^2 = \text{constant}$$

where N is the length of the preamble sequence according to the present invention, Q is the number of the transmit antennas, $s_{q,k}$ is a kth symbol in a preamble sequence transmitted from a qth transmit antenna, and $r_{j,n+k}$ is an (n+k)th signal in a preamble sequence received at a jth receive antenna.

Similarly, the start point of the frame is determined as a time point n where $\Phi_n=0$.

Since time index n in the fine frame synchronization indicates an FFT point, full complex multiplications will increase complexity considerably. However, with the use of the CAZAC sequence of a simple structure according to the present invention, only addition and switching will suffice.

With the sequence rotation of the present invention, a received signal is determined by $$r_j(k)=H_{0j}(k)S(k)+H_{1j}(k)\cdot(-1)^k S(k)+n_j(k) \qquad (16)$$

Even if channels are correlated, it is impossible to reduce SNR in the system. Yet, simulation results reveal that the present invention is robust compared to the conventional technology in which the same sequence is applied to all antennas.

Figure 10:
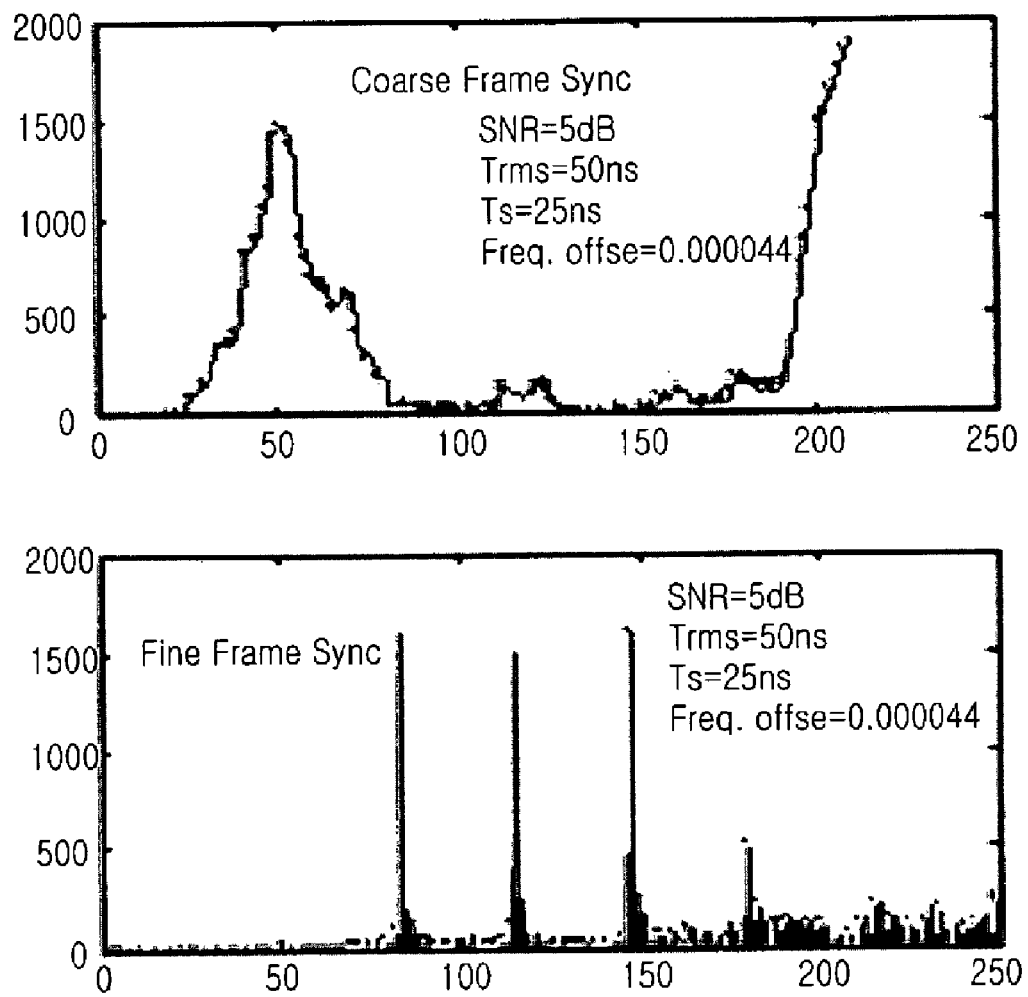
FIG. 10 illustrates the results of frame synchronization according to the present invention.

FIG. 10 illustrates the results of frame synchronization according to the present invention. Changes over time in coarse and fine frame synchronization metrics are illustrated. In FIG. 10, time points having the highest metric values are conspicuous in the fine frame synchronization.

While each transmit antenna transmits the same preamble sequence for two transmission periods as illustrated in FIG. 8 according to the embodiment of the present invention, it can be further contemplated as another embodiment that each transmit antenna transmits the same sequence for more than two transmission periods to allow more stable frame synchronization and more accurate channel estimation.

Figure 11:
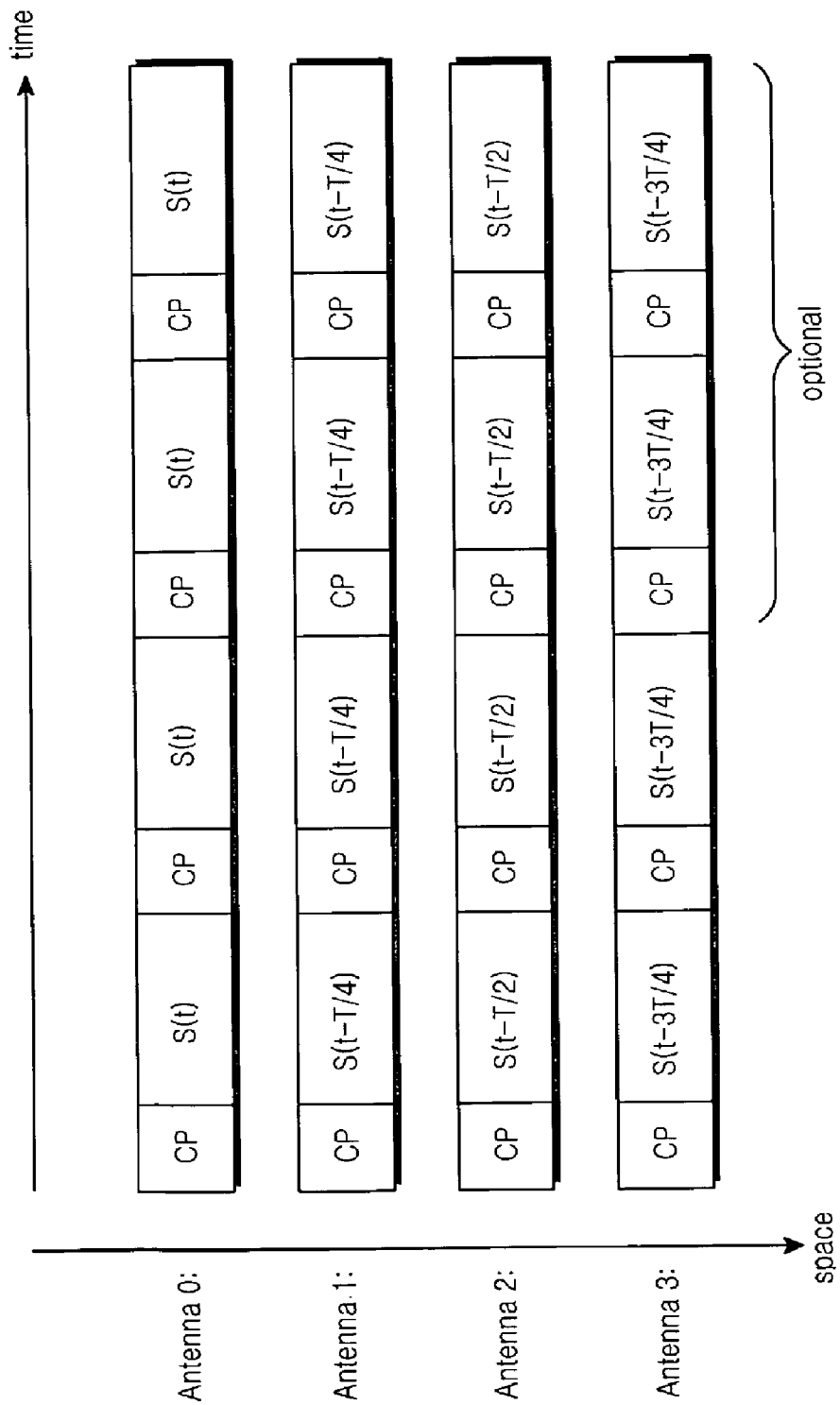
FIG. 11 illustrates an embodiment of a preamble structure for a 4×4 MIMO system according to the present invention.

FIG. 11 illustrates an embodiment of a preamble structure for a 4×4 MIMO system according to the present invention.

Referring to FIG. 11, for a first transmission period, a first antenna (antenna 0) transmits an extended CAZAC sequence S(t) and a second antenna (antenna 1) transmits a T/4-symbol rotated version of S(t), S(t−T/4). T denotes the period of the sequence. In the same manner, third and fourth antennas (antenna 2 and antenna 3) transmit T/2-symbol and 3T/4-symbol rotated versions of S(t), S(t−T/2) and S(t−3T/4), respectively. Each transmit antenna repeatedly transmits the same sequence for two or more transmission periods.

In general, a preamble structure for Q transmit antennas is given as illustrated in Table 2. In Table 2, PS denotes the index of a transmission period for the preamble sequence.

TABLE 2

| PS | 1 | 2 | ... |
|---|---|---|---|
| Antenna 1 | S(t) | S(t) | ... |
| Antenna 2 | S(t − T/Q) | S(t − T/Q) | ... |
| ... | ... | ... | ... |
| Antenna k | S(t − (k − 1)T/Q) | S(t − (k − 1)T/Q) | ... |
| ... | ... | ... | ... |
| Antenna Q | S(t − (Q − 1)T/Q) | S(t − (Q − 1)T/Q) | ... |

Meanwhile, if Q is greater than a predetermined number M, an (M+1)th to the last antenna cyclically transmits the sequences set for the first to Mth antennas. The preamble structure is created by repeating those sequences set for the first to Mth antennas in the space domain.

The CP length is determined by the range of frame synchronization. Thus, the maximum available number of transmit antennas, M is floor (N/$L_0$). $L_0$ is the maximum time delay spread of a sub-channel. If Q is greater than M, a preamble structure is created by repeating those sequences set for the first to Mth antennas in the space domain and an (M+1)th to the last antenna cyclically transmits the sequences set for first to Mth antennas. Also, to ensure robust channel estimation, the preamble structure is orthogonally designed in the time domain.

For example, if M=4 and Q=6, a preamble structure is given as illustrated in Table 3.

TABLE 3

| PS | 1 | 2 | 3 | ... |
|---|---|---|---|---|
| Antenna 1 | S(t) | S(t) | S(t) | ... |
| Antenna 2 | S(t − T/4) | S(t − T/4) | S(t − T/4) | ... |
| Antenna 3 | S(t − T/2) | S(t − T/2) | S(t − T/2) | ... |
| Antenna 4 | S(t − 3T/4) | S(t − 3T/4) | S(t − 3T/4) | ... |
| Antenna 5 | S(t) | −S(t) | S(t) | ... |
| Antenna 6 | S(t − T/4) | −S(t − T/4) | S(t − T/4) | ... |

Figure 12:
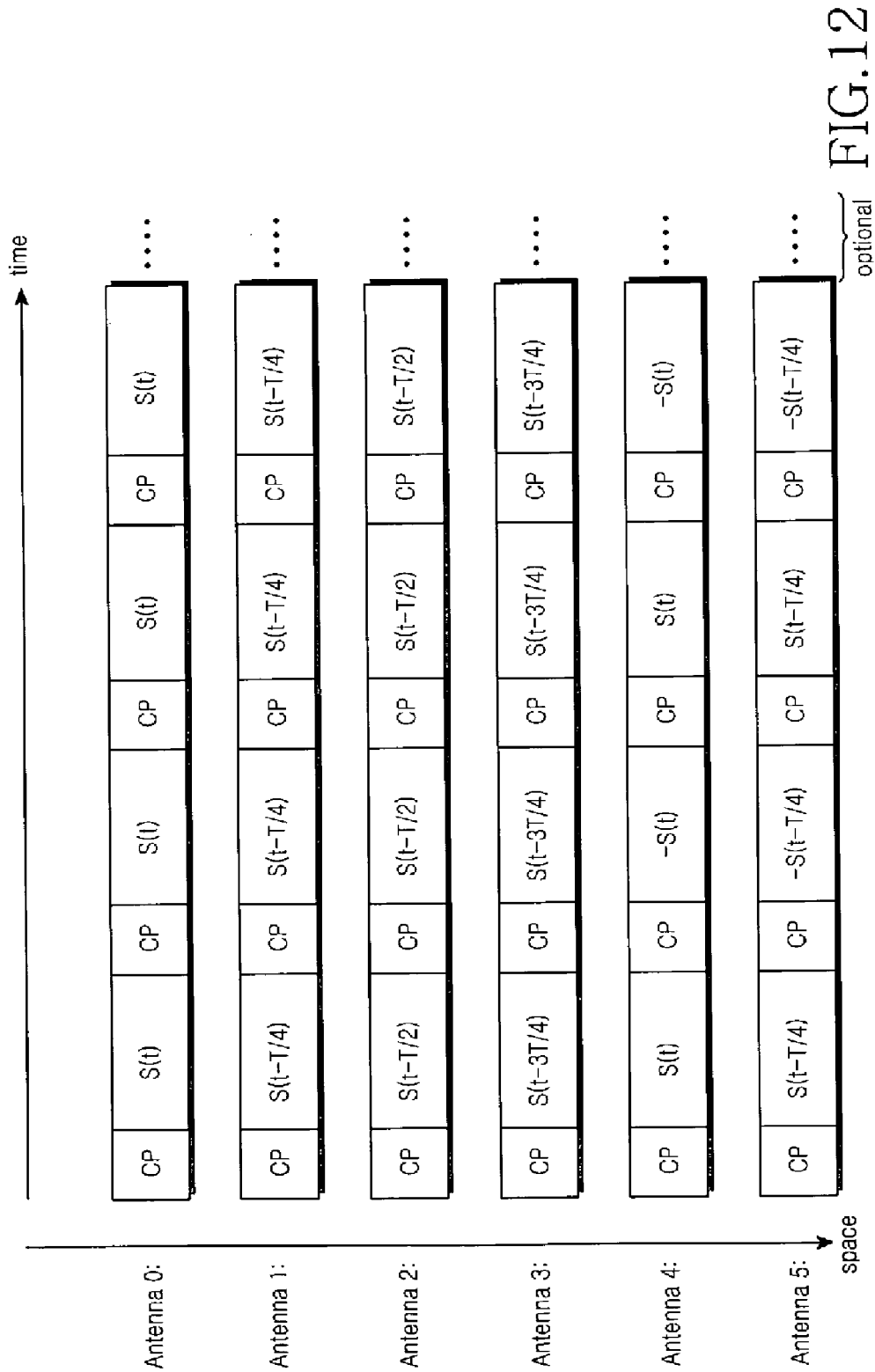
FIG. 12 illustrates an embodiment of a preamble structure for a 6×6 MIMO system according to the present invention.

FIG. 12 illustrates a preamble structure for a 6×6 MIMO system according to an embodiment of the present invention.

Referring to FIG. 12, for a first transmission period, a first antenna (antenna 0) transmits the extended CAZAC sequence S(t). Second, third and fourth antennas (antenna 1, antenna 2 and antenna 3) respectively transmit S(t−T/4), S(t−T/2) and S(t−3T/4) produced by rotating S(t) by T/4, T/2 and 3T/4, respectively. Fifth and sixth antennas (antenna 4 and antenna 5) transmit the sequences S(t) and S(t−T/4), respectively, starting from S(t) again. For second, third and fourth transmission periods, each antenna repeatedly transmits the same sequence except that the fifth and sixth antennas transmit inverse sequences −S(t) and −S(t−T/4), respectively, for the second and fourth transmission periods in order to ensure orthogonality in the time domain.

In the above case, a matrix block $$\begin{bmatrix} A & A \\ A & -A \end{bmatrix}$$

ensures the time-domain orthogonality. The rows of the matrix block represent antenna groups each having M transmit antennas and the columns represent sequence periods. Therefore, for M=4, one element A can accommodate up to four antennas. This preamble structure can support up to eight transmit antennas when M=4.

Figure 13:
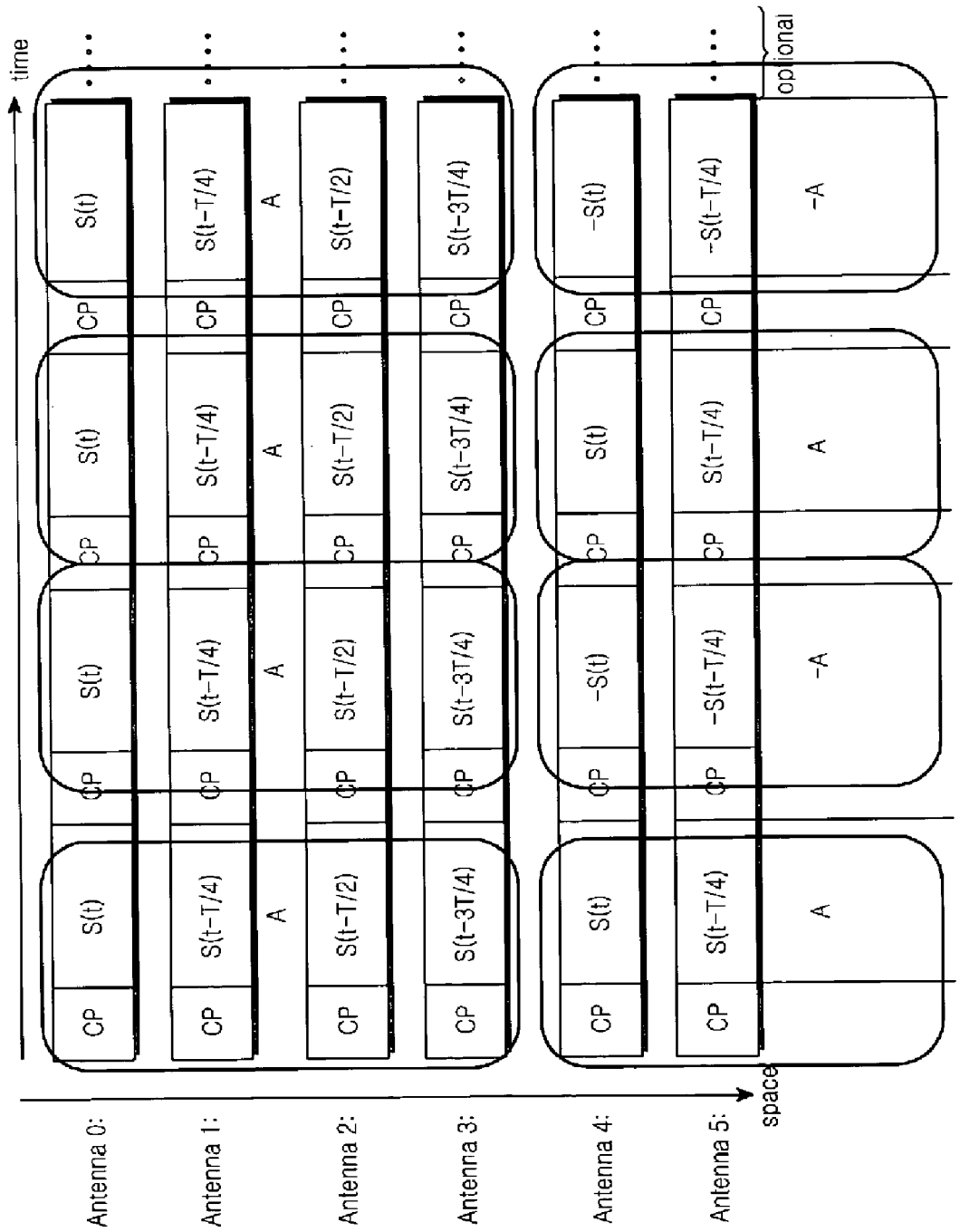
FIG. 13 illustrates preambles illustrated in FIG. 12 in matrix blocks.

FIG. 13 illustrates preambles illustrated in FIG. 12 in matrix blocks. Referring to FIG. 13, an element A in a matrix block for the 6×6 MIMO system is $$\begin{bmatrix} S(t) \\ S(t-T/M) \\ \vdots \\ S(t-(M-1)T/M) \end{bmatrix}.$$

Each antenna repeats a corresponding row of the element A or −A in the time domain. In this case, despite increased complexity, the accuracy of frame synchronization and channel estimation is improved.

To generalize, given Q transmit antennas (Q>M), antennas in different antenna groups transmit different preamble sequences. A kth antenna (k≦M) in a first antenna group having first to Mth antennas transmits a preamble sequence S(t−(k−1)T/M), whereas a k'th antenna (k'>M) in a second antenna group having (M+1)th to the last antennas transmits a preamble sequence $(-1)^{(PS-1)}$S(t−(k−M−1)T/M). Each antenna transmits the same preamble sequence repeatedly for two or more transmission periods.

Figure 14:
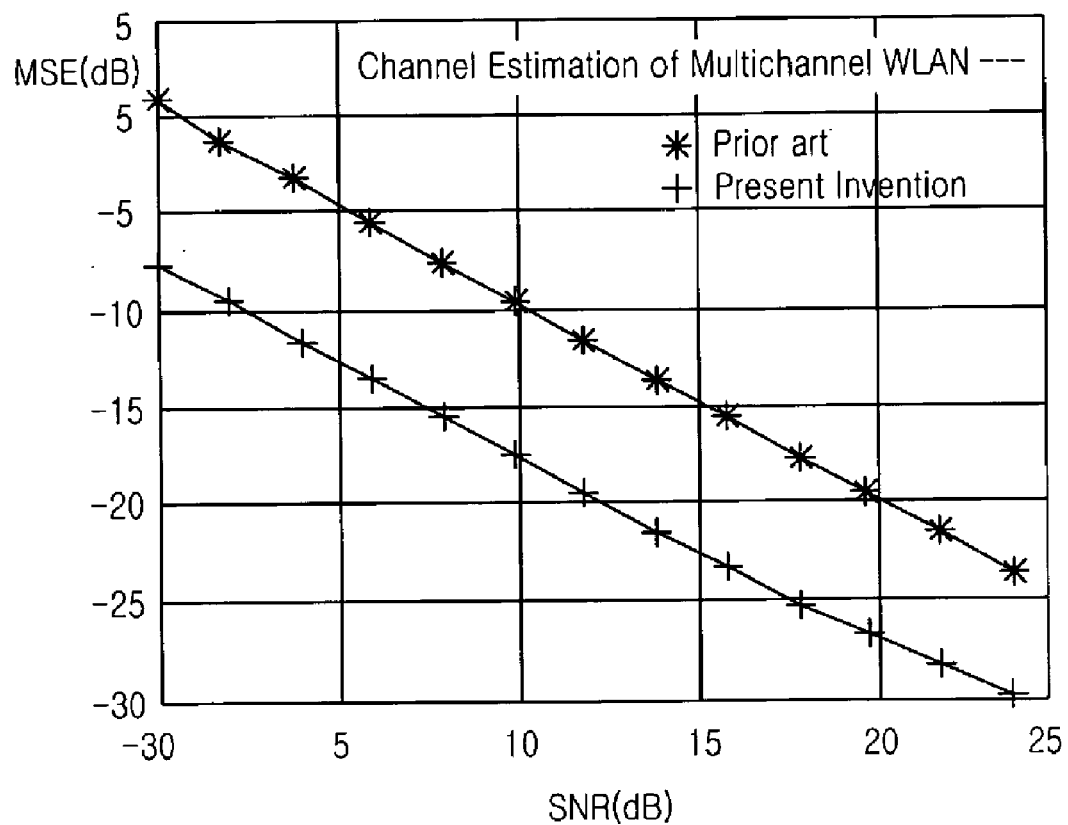
FIG. 14 is a graph illustrating channel estimation gain with respect to MSE in a multi-channel WLAN (Wireless Local Access Network) system using the preamble structure of the present invention.

FIG. 14 is a graph illustrating channel estimation gain with respect to MSE in a multi-channel WLAN system using the preamble structure of the present invention. * denotes MSE versus SNR in a conventional preamble structure and + denotes MSE versus SNR in the inventive preamble structure. As noted from FIG. 14, the inventive preamble structure offers less MSEs over all SNRs.

As described above, the preamble structure of the present invention flexibly controls the length of a preamble. Therefore, it is feasible for burst and high-mobility communications. Also, repetition of sequences in the time domain leads to a very excellent performance for frame synchronization and clock offset synchronization.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of receiving a preamble in an orthogonal frequency division multiplexing (OFDM) communication system using Q receiving antennas, comprising the steps of:
   receiving a preamble, the preamble being generated by:
      generating a base preamble sequence including a cyclic prefix (CP) and an orthogonal sequence; and
      generating a preamble sequence for each of the Q receiving antennas from the base preamble sequence by rotating the orthogonal sequence of the base preamble sequence by a different predetermined number of symbols, and at least twice receiving the generated preamble sequences, such that the preamble sequence received at a kth antenna is $(-1)^{(PS-1)}S(t-(k-M-1)T/M)$,
   wherein M is a predetermined number, k is greater than M, S(t) is the orthogonal sequence, T is the period of the orthogonal sequence, and PS is an index indicating a transmission period of the preamble sequence.

2. The method of claim 1, wherein generating a preamble sequence comprises, if Q is less than or equal to the predetermined number M, generating a preamble sequence for each of the receiving antennas such that a preamble sequence received from the kth antenna is $S(t-(k-1)T/M)$, where S(t) is the orthogonal sequence and T is the period of the orthogonal sequence.

3. A method of receiving a preamble in an orthogonal frequency division multiplexing (OFDM) communication system using Q receiving antennas, the method comprising:
   receiving a preamble, the preamble being generated by:
      generating a base preamble sequence including a cyclic prefix (CP) and an orthogonal sequence; and
      generating a preamble sequence for each of the Q receiving antennas from the base preamble sequence by rotating the orthogonal sequence of the base preamble sequence by a different predetermined number of symbols, and at least twice receiving the generated preamble sequences,
   wherein generating a preamble sequence comprises:
      if Q is greater than M, generating a preamble sequence for each of the receiving antennas such that if k is less than or equal to M, the preamble sequence received at the kth antenna is $S(t-(k-1)T/M)$, and
      if k is greater than M, the preamble sequence received from the kth antenna is $(-1)^{(PS-1)}S(t-(k-M-1)T/M)$, and
   wherein S(t) is the orthogonal sequence, T is the period of the orthogonal sequence, and PS is an index indicating a transmission period of the preamble sequence.

4. The method of claim 2, wherein M is an integer part of the quotient calculated by dividing the length N of the preamble sequence by a maximum delay spread $L_0$ of a sub-channel.

5. The method of claim 3, wherein M is an integer part of the quotient calculated by dividing the length N of the preamble sequence by a maximum delay spread $L_0$ of a sub-channel.

6. The method of claim 2, wherein M is 4.

7. The method of claim 3, wherein M is 4.

8. The method of claim 1, wherein the orthogonal sequence is an extended CAZAC (Constant Amplitude Zero Auto-Correlation) sequence.

9. A method of receiving a preamble in an orthogonal frequency division multiplexing (OFDM) communication system using Q receiving antennas, the method comprising:
   receiving a preamble, the preamble being generated by:
      generating a base preamble sequence including a cyclic prefix (CP) and an orthogonal sequence; and
      generating a preamble sequence for each of the Q receiving antennas from the base preamble sequence by rotating the orthogonal sequence of the base preamble sequence by a different predetermined number of symbols, and at least twice receiving the generated preamble sequences,
   wherein the orthogonal sequence is an extended CAZAC (Constant Amplitude Zero Auto-Correlation) sequence and the extended CAZAC sequence is 1, 0, 0, 0, 1, 0, 0, 0, 1, 0, 0, 0, 1, 0, 0, 0, 1, 0, 0, 0, j, 0, 0, 0, −1, 0, 0, 0, −j, 0, 0, 0, 1, 0, 0, 0, −1, 0, 0, 0, 1, 0, 0, 0, −1, 0, 0, 0, 1, 0, 0, 0, −j, 0, 0, 0, −1, 0, 0, 0, j.

10. A method of receiving a preamble in an orthogonal frequency division multiplexing (OFDM) communication system using a plurality of receiving antennas, the method comprising:
   receiving a preamble sequence having a cyclic prefix (CP) and an orthogonal sequence S(t) of period T;
   for a first sequence transmission period:
      receiving, through a first receiving antenna, a first preamble sequence having the CP and the S(t); and
      receiving, through a second receiving antenna, a second preamble sequence having the CP and a S(t−T/2); and
   for a second sequence transmission period:
      receiving, through the first receiving antenna, the first preamble sequence; and
      receiving, through the second receiving antenna, the second preamble sequence, such that the preamble sequence received at a kth antenna is $(-1)^{(PS-1)}S(t-(k-M-1)T/M)$,
   wherein M is a predetermined number, k is greater than M, S(t) is the orthogonal sequence, T is the period of the orthogonal sequence, and PS is an index indicating a transmission period of the preamble sequence.

11. A method of receiving a preamble in an orthogonal frequency division multiplexing (OFDM) communication system using a plurality of receiving antennas, the method comprising:
   receiving a preamble sequence having a cyclic prefix (CP) and an orthogonal sequence S(t) of period T;
   for a first sequence transmission period:

receiving, through a first receiving antenna, a first preamble sequence having the CP and the S(t);
receiving, through a second receiving antenna a second preamble sequence having the CP and a S(t−T/4);
receiving, through a third receiving antenna, a third preamble sequence having the CP and a S(t−T/2); and
receiving, through a fourth receiving antenna, a fourth preamble sequence having the CP and a S(t−3T/4); and
for a second sequence transmission period, receiving, the first to fourth preamble sequences through the first to fourth receiving antennas, respectively, such that the preamble sequence received at a kth antenna is $(-1)^{(PS-1)}S(t-(k-M-1)T/M)$,
wherein M is a predetermined number, k is greater than M, S(t) is the orthogonal sequence, T is the period of the orthogonal sequence, and PS is an index indicating a transmission period of the preamble sequence.

12. A method of receiving a preamble in an orthogonal frequency division multiplexing (OFDM) communication system using six receicing antennas, the method comprising:
generating a preamble sequence having a cyclic prefix (CP) and an orthogonal sequence S(t) of period T;
for a first sequence transmission period:
receiving, through a first receiving antenna, a first preamble sequence having the CP and the S(t);
receiving through a second receiving antenna, a second preamble sequence having the CP and a S(t−T/4);
receiving through a third receiving antenna, a third preamble sequence having the CP and a S(t−T/2);
receiving through a fourth receiving antenna, a fourth preamble sequence having the CP and a S(t−3T/4);
receiving through a fifth receiving antenna, the first preamble sequence; and
receiving through a sixth receiving antenna, the second preamble sequence; and
for a second sequence transmission period:
receiving, through the first receiving antenna, the first preamble sequence;
receiving, through the second receiving antenna, the second preamble sequence;
receiving, through the third receiving antenna, the third preamble sequence;
receiving through the fourth receiving antenna the fourth preamble sequence;
receiving through the fifth receiving antenna a fifth preamble sequence having the CP and a −S(t); and
receiving through the sixth receiving antenna a sixth preamble sequence having the CP and a −S(t−T/4).

13. The method of claim 10, wherein the second sequence transmission period is a next sequence transmission period following the first sequence transmission period.

14. The method of claim 11, wherein the second sequence transmission period is a next sequence transmission period following the first sequence transmission period.

15. An apparatus for receiving a preamble in an orthogonal frequency division multiplexing (OFDM) communication system, the apparatus comprising:
Q receiving antennas, each configured to receive a preamble sequence generated by:
generating a base preamble sequence including a cyclic prefix (CP) and an orthogonal sequence; and
generating a preamble sequence for each of the Q receiving antennas from the base preamble sequence by rotating the orthogonal sequence of the base preamble sequence by a different predetermined number of symbols, and at least twice receiving the generated preamble sequences, such that the preamble sequence received from a kth antenna is $(-1)^{(PS-1)}S(t-(k-M-1)T/M)$,
wherein M is a predetermined number, k is greater than M, S(t) is the orthogonal sequence, T is the period of the orthogonal sequence, and PS is an index indicating a transmission period of the preamble sequence.

16. The method of claim 15, wherein generating a preamble sequence comprises, if Q is less than or equal to the predetermined number M, generating a preamble sequence for each of the receiving antennas such that a preamble sequence received from the kth antenna is S(t−(k−1)T/M), where S(t) is the orthogonal sequence and T is the period of the orthogonal sequence.

17. An apparatus for receiving a preamble in an orthogonal frequency division multiplexing (OFDM) communication system, the apparatus comprising:
Q receiving antennas, each configured to receive a preamble sequence generated by:
generating a base preamble sequence including a cyclic prefix (CP) and an orthogonal sequence; and
generating a preamble sequence for each of the Q receiving antennas from the base preamble sequence by rotating the orthogonal sequence of the base preamble sequence by a different predetermined number of symbols, and at least twice receiving the generated preamble sequences,
wherein generating a preamble sequence comprises:
if Q is greater than M, generating a preamble sequence for each of the receiving antennas such that if k is less than or equal to M, the preamble sequence received from the kth antenna is S(t−(k−1)T/M), and
if k is greater than M, the preamble sequence received from the kth antenna is $(-1)^{(PS-1)}S(t-(k-M-1)T/M)$, and
wherein S(t) is the orthogonal sequence, T is the period of the orthogonal sequence, and PS is an index indicating a transmission period of the preamble sequence.

18. The apparatus of claim 16, wherein M is an integer part of the quotient calculated by dividing the length N of the preamble sequence by a maximum delay spread $L_0$ of a subchannel.

19. The apparatus of claim 17, wherein M is an integer part of the quotient calculated by dividing the length N of the preamble sequence by a maximum delay spread $L_0$ of a subchannel.

20. The apparatus of claim 16, wherein M is 4.

21. The apparatus of claim 17, wherein M is 4.

22. The apparatus of claim 15, wherein the orthogonal sequence is an extended CAZAC (Constant Amplitude Zero Auto-Correlation) sequence.

23. An apparatus for receiving a preamble in an orthogonal frequency division multiplexing (OFDM) communication system, the apparatus comprising:
Q receiving antennas, each configured to receive a preamble sequence generated by:
generating a base preamble sequence including a cyclic prefix (CP) and an orthogonal sequence; and
generating a preamble sequence for each of the Q receiving antennas from the base preamble sequence by rotating the orthogonal sequence of the base preamble sequence by a different predetermined number of symbols, and at least twice receiving the generated preamble sequences, wherein the orthogonal sequence is an extended CAZAC (Constant Amplitude Zero Auto-Correlation) sequence and the extended CAZAC sequence is 1, 0, 0, 0, 1, 0, 0, 0, 1, 0, 0, 0, 1, 0, 0, 0, 1, 0, 0, 0, j, 0, 0, 0, −1, 0, 0, 0, −j, 0, 0, 0, 1, 0, 0, 0, −1, 0, 0, 0, 1, 0, 0, 0, −1, 0, 0, 0, 1, 0, 0, 0, −j, 0, 0, 0, −1, 0, 0, 0, j.

24. An apparatus for receiving a preamble in an orthogonal frequency division multiplexing (OFDM) communication system, the apparatus comprising:
a plurality of receiving antennas, each configured to receive a preamble sequence generated by:
generating a preamble sequence having a cyclic prefix (CP) and an orthogonal sequence S(t) of period T;
for a first sequence transmission period:
receiving, through a first receiving antenna, a first preamble sequence having the CP and the S(t); and
receiving, through a second receiving antenna, a second preamble sequence having the CP and a S(t−T/2); and
for a second sequence transmission period:
receiving, through the first receiving antenna, the first preamble sequence; and
receiving, through the second receiving antenna, the second preamble sequence, such that the preamble sequence received from a kth antenna is $(-1)^{(PS-1)}S(t-(k-M-1)T/M)$,
wherein M is a predetermined number, k is greater than M, S(t) is the orthogonal sequence, T is the period of the orthogonal sequence, and PS is an index indicating a transmission period of the preamble sequence.

25. An apparatus for receiving a preamble in an orthogonal frequency division multiplexing (OFDM) communication system, the apparatus comprising:
a plurality of receiving antennas, each configured to receive a preamble sequence generated by:
generating a preamble sequence having a cyclic prefix (CP) and an orthogonal sequence S(t) of period T;
for a first sequence transmission period:
receiving, through a first receiving antenna, a first preamble sequence having the CP and the S(t);
receiving, through a second receiving antenna, a second preamble sequence having the CP and a S(t−T/4);
receiving, through a third receiving antenna, a third preamble sequence having the CP and a S(t−T/2); and
receiving, through a fourth receiving antenna, a fourth preamble sequence having the CP and a S(t−3T/4); and
for a second sequence transmission period, receiving the first to fourth preamble sequences through the first to fourth receiving antennas, respectively, such that the preamble sequence received from a kth antenna is $(-1)^{(PS-1)}S(t-(k-M-1)T/M)$,
wherein M is a predetermined number, k is greater than M, S(t) is the orthogonal sequence, T is the period of the orthogonal sequence, and PS is an index indicating a transmission period of the preamble sequence.

26. An apparatus for receiving a preamble in an orthogonal frequency division multiplexing (OFDM) communication system, the apparatus comprising:
six receiving antennas, each configured to receive a preamble sequence generated by:
generating a preamble sequence having a cyclic prefix (CP) and an orthogonal sequence S(t) of period T;
for a first sequence transmission period:
receiving, through a first receiving antenna, a first preamble sequence having the CP and the S(t);
receiving, through a second receiving antenna, a second preamble sequence having the CP and a S(t−T/4);
receiving, through a third receiving antenna, a third preamble sequence having the CP and a S(t−T/2);
receiving, through a fourth receiving antenna, a fourth preamble sequence having the CP and a S(t−3T/4);
receiving, through a fifth receiving antenna, the first preamble sequence; and
receiving, through a sixth receiving antenna, the second preamble sequence; and
for a second sequence transmission period:
receiving, through the first receiving antenna, the first preamble sequence;
receiving, through the second receiving antenna, the second preamble sequence;
receiving, through the third receiving antenna, the third preamble sequence;
receiving, through the fourth receiving antenna, the fourth preamble sequence;
receiving, through the fifth receiving antenna, a fifth preamble sequence having the CP and a −S(t); and
receiving, through the sixth receiving antenna, a sixth preamble sequence having the CP and a −S(t−T/4).

27. The apparatus of claim 24, wherein the second sequence transmission period is a next sequence transmission period following the first sequence transmission period.

28. The apparatus of claim 25, wherein the second sequence transmission period is a next sequence transmission period following the first sequence transmission period.

29. An apparatus for transmitting a preamble in an orthogonal frequency division multiplexing (OFDM) communication system, the apparatus comprising:
Q transmit antennas; and
a preamble generating device configured to:
generate a base preamble sequence including a cyclic prefix (CP) and an orthogonal sequence; and
generate a preamble sequence for each of the Q transmit antennas from the base preamble sequence by rotating the orthogonal sequence of the base preamble sequence by a different predetermined number of symbols, and at least twice transmitting the generated preamble sequences from the Q transmit antennas, such that the preamble sequence transmitted from a kth antenna is $(-1)^{(PS-1)}S(t-(k-M-1)T/M)$,
wherein M is a predetermined number, k is greater than M, S(t) is the orthogonal sequence, T is the period of the orthogonal sequence, and PS is an index indicating a transmission period of the preamble sequence.

30. The apparatus of claim 29, wherein step (2) comprises the step of, if Q is less than or equal to the predetermined number M, generating a preamble sequence for each of the transmit antennas such that a preamble sequence transmitted from the kth antenna is S(t−(k−1)T/M), where S(t) is the orthogonal sequence and T is the period of the orthogonal sequence.

31. An apparatus for transmitting a preamble in an orthogonal frequency division multiplexing (OFDM) communication system, the apparatus comprising:
Q transmit antennas; and
a preamble generating device configured to: generate a base preamble sequence including a cyclic prefix (CP) and an orthogonal sequence; and generate a preamble sequence for each of the Q transmit antennas from the base preamble sequence by rotating the orthogonal sequence of the base preamble sequence by a different predetermined number of symbols, and at least twice transmitting the generated preamble sequences from the Q transmit antennas, wherein generating a preamble sequence comprises:

if Q is greater than M, generating a preamble sequence for each of the transmit antennas such that if k is less than or equal to M, the preamble sequence transmitted from the kth antenna is $S(t-(k-1)T/M)$, and if k is greater than M, the preamble sequence transmitted from the kth antenna is $(-1)^{(PS-1)}S(t-(k-M-1)T/M)$, and wherein S(t) is the orthogonal sequence, T is the period of the orthogonal sequence, and PS is an index indicating a transmission period of the preamble sequence.

32. The apparatus of claim 30, wherein M is an integer part of the quotient calculated by dividing the length N of the preamble sequence by a maximum delay spread $L_0$ of a sub-channel.

33. The apparatus of claim 31, wherein M is an integer part of the quotient calculated by dividing the length N of the preamble sequence by a maximum delay spread $L_0$ of a sub-channel.

34. The apparatus of claim 30, wherein M is 4.

35. The apparatus of claim 31, wherein M is 4.

36. The apparatus of claim 29, wherein the orthogonal sequence is an extended CAZAC (Constant Amplitude Zero Auto-Correlation) sequence.

37. An apparatus for transmitting a preamble in an orthogonal frequency division multiplexing (OFDM) communication system using, the apparatus comprising:

Q transmit antennas; and a preamble generating device configured to:

generate a base preamble sequence including a cyclic prefix (CP) and an orthogonal sequence; and generate a preamble sequence for each of the Q transmit antennas from the base preamble sequence by rotating the orthogonal sequence of the base preamble sequence by a different predetermined number of symbols, and at least twice transmitting the generated preamble sequences from the Q transmit antennas, wherein the orthogonal sequence is an extended CAZAC (Constant Amplitude Zero Auto-Correlation) sequence and the extended CAZAC sequence is 1, 0, 0, 0, 1, 0, 0, 0, 1, 0, 0, 0, 1, 0, 0, 0, 1, 0, 0, 0, j, 0, 0, 0, −1, 0, 0, 0, −j, 0, 0, 0, 1, 0, 0, 0, −1, 0, 0, 0, 1, 0, 0, 0, −1, 0, 0, 0, 1, 0, 0, 0, −j, 0, 0, 0, −1, 0, 0, 0, j.

38. An apparatus for transmitting a preamble in an orthogonal frequency division multiplexing (OFDM) communication system, the apparatus comprising:

a plurality of transmit antennas; and a preamble generating device configured to:

generate a preamble sequence having a cyclic prefix (CP) and an orthogonal sequence S(t) of period T;

for a first sequence transmission period:

transmit, through a first of the transmit antennas, a first preamble sequence having the CP and the S(t); and transmit, through a second of the transmit antennas, a second preamble sequence having the CP and a $S(t-T/2)$; and for a second sequence transmission period:

transmit, through the first transmit antenna, the first preamble sequence; and transmit, through the second transmit antenna, the second preamble sequence, such that the preamble sequence transmitted from a kth antenna is $(-1)^{(PS-1)}S(t-(k-M-1)T/M)$, wherein M is a predetermined number, k is greater than M, S(t) is the orthogonal sequence, T is the period of the orthogonal sequence, and PS is an index indicating a transmission period of the preamble sequence.

39. An apparatus for transmitting a preamble in an orthogonal frequency division multiplexing (OFDM) communication system, the apparatus comprising:

a plurality of transmit antennas; and a preamble generating device configured to:

generate a preamble sequence having a cyclic prefix (CP) and an orthogonal sequence S(t) of period T;

for a first sequence transmission period:

transmit, through a first of the transmit antennas, a first preamble sequence having the CP and the S(t);

transmit, through a second of the transmit antennas, a second preamble sequence having the CP and a $S(t-T/4)$;

transmit, through a third of the transmit antennas, a third preamble sequence having the CP and a $S(t-T/2)$; and transmit, through a fourth of the transmit antennas, a fourth preamble sequence having the CP and a $S(t-3T/4)$; and for a second sequence transmission period, transmit the first to fourth preamble sequences through the first to fourth transmit antennas, respectively, such that the preamble sequence transmitted from a kth antenna is $(-1)^{(PS-1)}S(t-(k-M-1)T/M)$, wherein M is a predetermined number, k is greater than M, S(t) is the orthogonal sequence, T is the period of the orthogonal sequence, and PS is an index indicating a transmission period of the preamble sequence.

40. An apparatus for transmitting a preamble in an orthogonal frequency division multiplexing (OFDM) communication system using, the apparatus comprising:

six transmit antennas; and a preamble generating device configured to:

generating a preamble sequence having a cyclic prefix (CP) and an orthogonal sequence S(t) of period T;

for a first sequence transmission period:

transmit, through a first of the transmit antennas, a first preamble sequence having the CP and the S(t);

transmit, through a second of the transmit antennas, a second preamble sequence having the CP and a $S(t-T/4)$;

transmit, through a third of the transmit antennas, a third preamble sequence having the CP and a $S(t-T/2)$;

transmit, through a fourth of the transmit antennas, a fourth preamble sequence having the CP and a $S(t-3T/4)$;

transmit, through a fifth of the transmit antennas, the first preamble sequence; and transmit, through a sixth of the transmit antennas, the second preamble sequence; and for a second sequence transmission period:

transmit, through the first transmit antenna, the first preamble sequence;

transmit, through the second transmit antenna, the second preamble sequence;

transmit, through the third transmit antenna, the third preamble sequence;
transmit, through the fourth transmit antenna, the fourth preamble sequence;
transmit, through the fifth transmit antenna, a fifth preamble sequence having the CP and a −S(t); and
transmit, through the sixth transmit antenna, a sixth preamble sequence having the CP and a −S(t−T/4).

41. The apparatus of claim 38, wherein the second sequence transmission period is a next sequence transmission period following the first sequence transmission period.

42. The apparatus of claim 39, wherein the second sequence transmission period is a next sequence transmission period following the first sequence transmission period.

* * * * *